Figure 1:
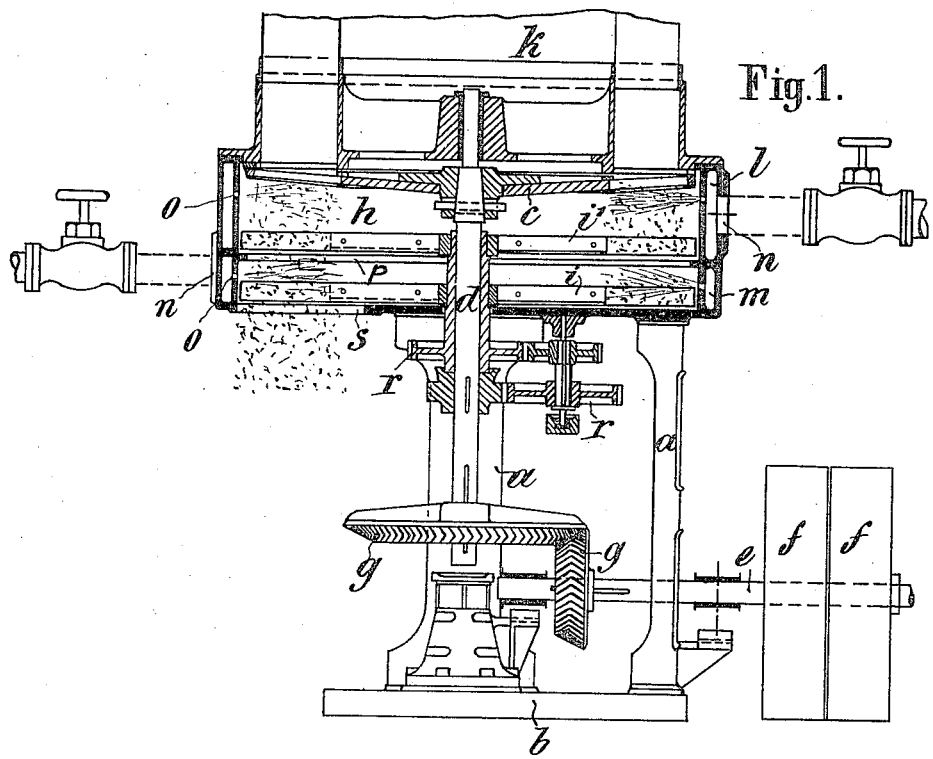

M. PASCHEN.
APPARATUS FOR HEATING BEET SLICES.
APPLICATION FILED FEB. 7, 1912.

1,042,261.

Patented Oct. 22, 1912.

WITNESSES:
John C. Sanders
Albert F. Heuman

INVENTOR:
Max Paschen
BY
ATTY.

UNITED STATES PATENT OFFICE.

MAX PASCHEN, OF KÖTHEN, GERMANY.

APPARATUS FOR HEATING BEET-SLICES.

1,042,261.   Specification of Letters Patent.   Patented Oct. 22, 1912.

Application filed February 7, 1912. Serial No. 676,078.

*To all whom it may concern:*

Be it known that I, MAX PASCHEN, a subject of the Emperor of Germany, residing at 18 Schillerstrasse, Köthen, Anhalt, in the German Empire, have invented certain new and useful Improvements in Apparatus for Heating Beet-Slices, of which the following is a specification.

The present invention relates to an apparatus for heating beet slices for the purpose of extracting the juice therefrom and wherein the slices are carried through a current of steam.

In the apparatus of this kind as hitherto constructed the steaming was effected merely by fitting a steam pipe to the receptacle through which the slices fell—this receptacle was generally the slice-receiving hopper of the slicing machine itself—steam being admitted to the hopper from this pipe. Experience has demonstrated that this known form of apparatus does not always furnish satisfactory results because, especially when the height through which the slices fall is restricted, as is frequently the case owing to constructional considerations, the time during which the steam acts on the freely falling slices is not sufficient. An increase in the height of fall produces but relatively little improvement, because, coupled with this increase of fall, there is a very considerable increase in the velocity in the lower part of the steam chamber owing to well-known dynamic laws.

In accordance with the present invention this defect is overcome owing to the fact that the heating receptacle of the apparatus, which has hitherto not been sub-divided is here divided by a receiving bottom over which a special scraper or ejector passes. By means of this receiving bottom the height of fall available is divided into sections, the slices coming to rest between these two sections in the drop whereby they are exposed for a longer time to the action of the steam while falling freely without the necessity for increasing the height of the fall. By providing separate regulating means for the steam supply and heating in the two sections of the fall it is possible to adapt the preliminary treatment of the slices exactly to practical requirements and in particular to take into account that the slices on reaching the second zone have already been preliminarily heated so that they will not be influenced in the same way as in the first zone by the fresh steam admitted to the second zone. It is also known to treat the slices by means of a current of steam or hot gases during their passage from the slicing machine to the apparatus serving for extracting the juice. It is true that adequate time is then provided for the heating but nevertheless the apparatus operating on this principle are of poor efficiency, because, during the passage of the slices, they are stationary relatively to the conveyer device and furthermore they are heaped in masses of considerable size. Consequently it is impossible to treat the slices uniformly as a portion of the slices is already completely scalded while the other is far from being sufficiently warmed.

The present invention is directed exclusively to the treatment of the slices while falling freely, which alone effects sufficient heating without scalding, this being attained by causing the slices to fall step-by-step and prolonging the period of fall without at the same time increasing the height of fall.

An embodiment of the invention is diagrammatically illustrated by way of example as applied to a slicing machine in the accompanying drawing, in which:—

Figure 2:
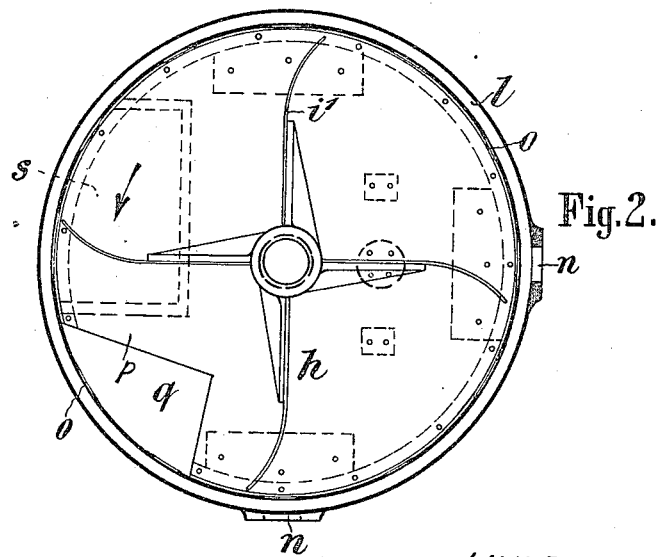

Figure 1 is a vertical section of the machine, and Fig. 2 is a plan thereof.

The machine consists in the usual manner of the frame $a$ with base plate $b$, slicing disk $c$, vertical shaft $d$, horizontal shaft $e$ fast and loose pulleys $f$, pair of bevel wheels $g$, the slice receiving hopper $h$ with ejector $i$ and beet supply hopper $k$.

The slice-receiving hopper $h$ is steam-jacketed, this jacket being divided by a partition into the two separate superposed annular chambers $l$ and $m$; each of these chambers $l$ and $m$ is provided with a separate socket $n$ and a steam supply pipe indicated in broken lines in Fig. 1 and provided with a regulating valve. When the walls of the slice-receiving hopper have been heated by the steam it is distributed through the peripheral nozzle-like slots $o$ into the interior of the hopper so that it is uniformly mixed with the slices. In accordance with the invention the hopper $h$ is divided into two zones by a receiving bottom $p$. The slices which have already been steamed in the upper zone are retained by this bottom and remain exposed to the action of the steam resting on the bottom until they are conveyed by the ejector $i'$ through the opening $q$ (Fig. 2) into the lower zone of the hopper from which, after further treatment with steam they are removed by the ejector $i$ through the opening $s$ which is only indicated in broken lines in Fig. 2. As shown in Fig. 2, the opening $q$ tapers on the left hand end and flares in the direction (indicated by an arrow) of the rotation of the ejector. This arrangement is of important advantage for obtaining efficiency in the operation as owing to the gradually flaring form of the fall aperture the slices descend singly so that they come more intimately into contact with the steam in the second zone of fall than if the fall opening presented a uniform cross section from which the whole of the slices displaced by the ejector would descend in compact masses. By means of the novel arrangement of the opening $q$ which renders uniform the fall of the slices on an intermediate stage (that is to say the receiving bottom $p$) the operation is simultaneously rendered more independent of the supply of slices from the slicing disk which is of course not invariably uniform.

In the relative arrangement of the openings $q$ and $s$ shown in Fig. 2 care must be taken that it is impossible for the slices to fall directly from the receiving bottom $p$ through the opening $s$.

What I claim and desire to secure by Letters Patent of the United States is:—

The herein described apparatus for heating beet slices for extracting the juice therefrom, comprising a heating receptacle divided into a plurality of compartments, a steam jacket around the receptacle, also divided into a plurality of superposed chambers, steam-regulating means fitted to each chamber, means for ejecting the slices from the bottom of one compartment on to that next below and means for discharging the slices from the bottom of the lowermost compartment.

In testimony whereof I affix my signature in presence of two witnesses.

MAX PASCHEN.

Witnesses:
   HENRY HASPER,
   WOLDEMAR HAUPT.

---

Copies of this patent may be obtained for five cents each, by addressing the "Commissioner of Patents, Washington, D. C."